US011514745B1

(12) United States Patent
Shipman, Jr.

(10) Patent No.: US 11,514,745 B1
(45) Date of Patent: Nov. 29, 2022

(54) REMOTE PURCHASE AND AUTOMATED DELIVERY SYSTEM FOR CONTROLLED ACCESS FACILITIES

(71) Applicant: Tech Friends, Inc., Jonesboro, AR (US)

(72) Inventor: Bobby L. Shipman, Jr., Jonesboro, AR (US)

(73) Assignee: Tech Friends, Inc., Jonesboro, AR (US)

( * ) Notice: Subject to any disclaimer, the term of this patent is extended or adjusted under 35 U.S.C. 154(b) by 0 days.

(21) Appl. No.: 16/776,917

(22) Filed: Jan. 30, 2020

Related U.S. Application Data

(63) Continuation-in-part of application No. 16/529,225, filed on Aug. 1, 2019, and a continuation-in-part of application No. 16/681,322, filed on Nov. 12, 2019.

(51) Int. Cl.
*G07F 11/02* (2006.01)
*G06Q 20/18* (2012.01)

(52) U.S. Cl.
CPC ............ *G07F 11/02* (2013.01); *G06Q 20/18* (2013.01)

(58) Field of Classification Search
CPC ...... G06Q 30/0207–0277; G06Q 20/18; G07F 11/02
See application file for complete search history.

(56) References Cited

U.S. PATENT DOCUMENTS

| | | | |
|---|---|---|---|
| 7,756,604 B1* | 7/2010 | Davis | G06Q 20/342 700/240 |
| 8,498,937 B1* | 7/2013 | Shipman, Jr. | G06Q 40/02 705/41 |
| 8,781,622 B2* | 7/2014 | Mockus | G06Q 20/327 700/232 |
| 8,788,341 B1* | 7/2014 | Patel | G07F 9/001 700/231 |
| 10,438,184 B2* | 10/2019 | Barragán Treviño | G07F 9/001 |
| 10,922,915 B2* | 2/2021 | Peters | G07F 17/005 |
| 2002/0165788 A1* | 11/2002 | Bates | G06Q 20/20 705/16 |
| 2006/0207856 A1* | 9/2006 | Dean | G07F 17/26 194/302 |
| 2012/0029691 A1* | 2/2012 | Mockus | H04W 4/02 700/231 |
| 2014/0218466 A1* | 8/2014 | Bloms | G06Q 50/26 348/14.09 |
| 2014/0219432 A1* | 8/2014 | Bengston | H04M 3/42221 379/196 |

(Continued)

FOREIGN PATENT DOCUMENTS

| | | | |
|---|---|---|---|
| WO | WO-2015169356 A1 * | 11/2015 | G06Q 20/202 |
| WO | WO-2018042669 A1 * | 3/2018 | G06Q 20/202 |

*Primary Examiner* — Michael Collins
(74) *Attorney, Agent, or Firm* — Schrantz Law Firm, PLLC; Stephen D. Schrantz

(57) ABSTRACT

A delivery system applies rules for authorizing transactions to a recipient that are individualized for each recipient. These rules may limit the number of items available for the purchaser to purchase for a recipient, the types of items available for purchase for a recipient, and the price of the items for the recipient. The system automates the delivery of the item to the recipient via a kiosk, such as a vending machine. An identification device of the vending machine identifies the recipient. The vending machine dispenses the items to the identified recipient.

12 Claims, 6 Drawing Sheets

(56) References Cited

U.S. PATENT DOCUMENTS

| | | | | |
|---|---|---|---|---|
| 2015/0149345 A1* | 5/2015 | Nayler | ............... | G07F 19/209 |
| | | | | 705/39 |
| 2016/0098882 A1* | 4/2016 | Holdych | ............... | G07F 9/10 |
| | | | | 700/237 |
| 2017/0301222 A1* | 10/2017 | Lyman | ............... | G08B 17/02 |
| 2019/0180262 A1* | 6/2019 | Huang | ............... | G06Q 20/3276 |
| 2020/0258179 A1* | 8/2020 | Passe | ............... | G06Q 50/26 |
| 2021/0065267 A1* | 3/2021 | Smith | ............... | G07F 9/002 |

\* cited by examiner

REMOTE PURCHASE AND AUTOMATED DELIVERY SYSTEM FOR CONTROLLED ACCESS FACILITIES

CROSS-REFERENCE TO RELATED APPLICATIONS

This application claims priority to and is a continuation in part of U.S. patent application Ser. No. 16/529,225 entitled "RULE BASED VENDING MACHINE SYSTEM" that was filed on Aug. 1, 2019 which is hereby incorporated by reference. This application also claims priority to and is a continuation in part of U.S. patent application Ser. No. 16/681,322 entitled "PAYMENT DISTRIBUTION SYSTEM AND METHOD" that was filed on Nov. 12, 2019 which is hereby incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

I. Field of the Invention

The present invention relates generally to a delivery system. The present invention relates to a vending machine that delivers remotely purchased items, including goods and/or products. The delivery system applies rules when interacting with the users purchasing items, such as goods, for the recipient. More particularly, the present invention relates to a delivery machine that applies rules for dispensing items to recipients and billing the purchasers for the requested items. The present invention also relates to a delivery system that refunds the purchaser should the good(s)/item(s) be damaged, faulty, not delivered, out of stock, or other issues that may occur. The present invention also relates to a delivery system for controlled-environment facilities, including prisons and jails. The present invention also relates to a system for distributing items to users, such as inmates, in a controlled environment facility. The present invention also relates to a delivery system implemented via at least one vending machine.

II. Description of the Known Art

Various types of vending machines are presently used. These vending machines dispense items based upon receiving the appropriate payment or compensation. These vending machines do not allow for remote purchase of item(s) and/or good(s) to be delivered to the recipient. These vending machines do not distribute item(s) and/or good(s) to a recipient based on the identity of the recipient. These vending machines do not apply rules for whether the machine should dispense the item.

Certain problems exist with the known art. Any person with the proper payment or compensation can purchase any item.

Therefore, the present invention is needed to provide a unique delivery system that applies rules for dispensing items. Such a delivery system may limit access to particular items or limit the number of purchased items. The delivery system may also provide items to others that may need financial assistance.

SUMMARY OF THE INVENTION

The present invention relates to a delivery system that enables a purchaser, such as a third party, to purchase item(s), such as food, products, health products, beauty products, consumable items, services, etc. to be delivered to a recipient. These third parties purchase the item(s) remotely to then be delivered to the recipient. The delivery system delivers the item(s) via a vending machine accessed by the recipient. The vending machine identifies the recipient prior to delivering any item(s) to the recipient. The vending machine vends items purchased by an outside purchaser to the recipient located within the facility. The vending machine logs products vended to the recipient.

The delivery system applies rules for allowing delivery of the item(s) to the recipient. The rules of one embodiment are individualized for each recipient. The rules may also be applied to a group of recipients. These rules may limit the number of items available to the recipient and the types of items available to the recipient.

The vending machine system provides an identification device that identifies the recipient. The identification device identifies the recipient accessing the vending machine via captured identification data captured from the recipient at the time of accessing the vending machine. Such identification data may include, but not limited to, a password, authentication code, an identification device, a scanned wristband or biometric identification.

The delivery system stores identification data that identifies the recipient. Such stored identification data is acquired from the recipient. Such stored identification data may be acquired during enrollment to the delivery system, during processing of an inmate, prior to use of the delivery system, or other time at which the recipient's identity can be verified. The system stores the stored identification data of the recipient. The system stores the stored identification data locally and/or remotely. In one embodiment, the delivery system stores the stored identification data on a server. The vending machine communicates with the server wirelessly or through a wired connection.

The delivery system authenticates the user via stored identification data. The delivery system compares the captured identification data with the stored identification data to authenticate the recipient. Such a comparison may be performed by the server or by the vending machine. The system applies rules to the authenticated recipient according to rules established for the system.

The delivery system accepts a purchase from a purchaser that identifies a requested item to be delivered to the recipient. The system applies rules to determine whether to allow the purchase of the item for the recipient. The server applies the rules for the recipient and the requested item. The system then authorizes the purchase or denies the purchase based upon the rules.

The system bills the purchaser according to the purchase price for the designated recipient. Such a purchase price may be based upon the recipient or the type of recipient. Such types of recipients may include indigent recipients, discounted recipients, VIP recipient, federal inmate, state inmate, employee, officer, or other identified type. Upon payment of the purchase price established for the recipient, the system allows purchase of the item for the recipient. The system may store a purchase history or recipient's account history that accounts for the recipient's total number of received items and/or dispensed items for applying the rules.

The delivery system of one embodiment then alerts the recipient with an item alert notifying the recipient that an item has been purchased for the recipient. The item alert of one embodiment indicates the item to be delivered, the identity of the purchaser, the date and time by which the item must be retrieved, and the location at which the item is available. The alert may include any of the above information. The alert may be delivered by electronic mail, SMS message, an electronic message, an alert generated upon identifying the recipient, etc.

It is an object of the present invention to provide a delivery system for delivering items to a recipient.

It is an object of the present invention to provide a delivery system for delivering items purchased by an offsite purchaser to a recipient.

It is an object of the present invention to provide a delivery system that applies rules for dispensing items to a recipient.

It is another object of the present invention to provide a delivery system that establishes a price for an item based upon the recipient.

It is another object of the present invention to limit abuse of a vending machine.

It is another object of the present invention to provide for proper diets of recipient.

It is another object of the present invention to avoid stockpiling of purchased items.

It is another object of the present invention to meet the dietary needs of the recipient.

It is another object of the present invention to establish a purchase price for the types of users.

It is an object of the present invention to enable refunding the purchaser the amount paid for items that were not delivered to the recipient.

It is an object of the present invention to enable refunding the purchaser the amount paid for items that were refused by the recipient.

It is an object of the present invention to track the items delivered to the recipient.

It is an object of the present invention to track the items purchased by a purchaser.

It is an object of the present invention to provide quicker delivery of items to a recipient.

It is an object of the present invention to provide specified items to a recipient without providing funds that could be spent otherwise.

It is an object of the present invention to designate funds to a specific item to be delivered quickly to a recipient.

It is an object of the present invention to deliver an item in a timely manner via a vending machine.

It is an object of the present invention to deliver an item to a recipient within a controlled environment facility in a timely manner prior to release of the recipient.

It is an object of the present invention to safely deliver items to the recipient.

It is an object of the present invention to avoid damaging items delivered to the recipient.

It is an object of the present invention to send a delivery notification indicating that a recipient received an item.

It is an object of the present invention to confirm delivery of an item to a recipient.

It is an object of the present invention to allow substituting a similar item for purchased items that are out of stock.

It is another object of the present invention to limit packaging materials to avoid giving inmates access to unapproved materials.

It is an object of the present invention to limit training and requiring personnel for a picking system to provide items to recipients.

It is an object of the present invention to deliver items through a vending machine to avoid shipping temperature controlled containers.

It is an object of the present invention to limit personnel's involvement with delivering items to a recipient.

It is an object of the present invention to create a safer environment by decreasing human interaction for delivering items to the recipients.

It is an object of the present invention to authenticate recipients to confirm proper delivery of the items.

These and other objects and advantages of the present invention, along with features of novelty appurtenant thereto, will appear or become apparent by reviewing the following detailed description of the invention.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
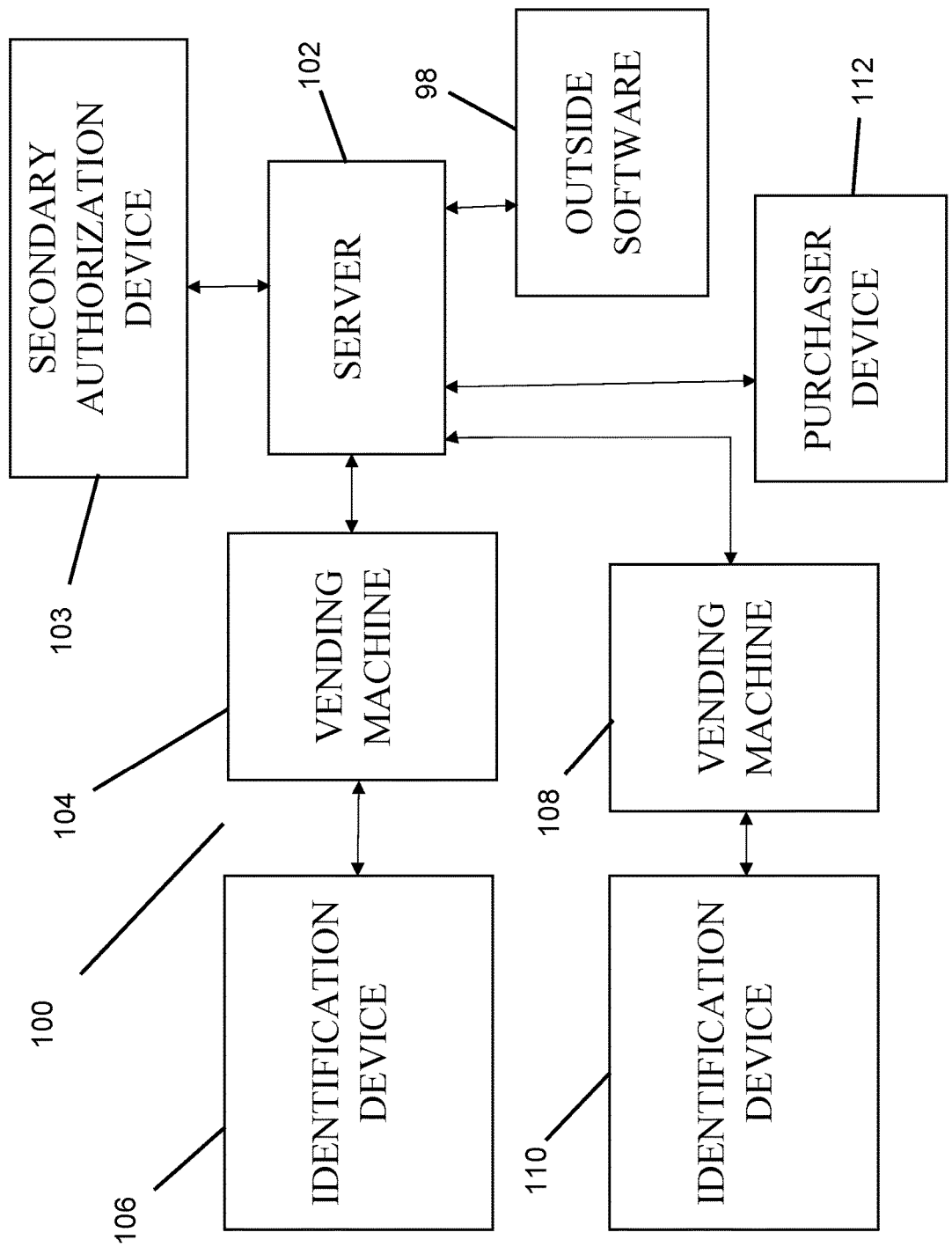
FIG. 1 is an environmental view of one embodiment of the present invention.

The delivery system and method of delivery relates generally to automated delivery of an item to a recipient. The item is purchased by a purchaser for the recipient. The recipient may be located within a controlled environment facility. The purchaser is normally located outside of the controlled environment facility. The purchaser shops online through an application or other software on a computing device, a kiosk, or by phone.

The purchaser selects a recipient and an item to be delivered to the recipient. The purchaser may be required to select a recipient and a controlled environment facility in which the recipient is located. In one embodiment, the items are limited to those items that are available within the facility. In another embodiment, the items are limited to those items within a vending machine within the facility. In another embodiment, the items are limited to those items that can be added to a vending machine or automated delivery unit. The system associates the item with the recipient. The system then completes the transaction upon delivery of the item to the recipient. If the item is not delivered to the recipient, the system cancels the transaction and refunds the purchaser. Such refund may occur if the item is not delivered within a given time period or if the recipient is released from the facility prior to delivery of the item. The system may also refund the purchaser if the status of the recipient changes such that the rules no longer allow the recipient to receive the item. Such status change could occur after purchasing but prior to delivering the item to the recipient. The system applies the rules at the time of purchasing the time and the time of delivering the item. Such refund may be automated.

The system applies rules implementing which items are available to a recipient. These rules restrict the items available to a user. Each facility may implement its own rules. These rules are specific to the user and/or type of user. The delivery system applies the rules according to the recipient. The rules determine whether the system should dispense a requested item to the recipient. The system authorizes dispensing a requested item or denies dispensing the requested item based upon the rules. These rules may be based on gender, religion, behavior, holiday, or other rules applied by the facility.

The system also implements rules for purchases allowed by a purchaser. As indicated above, the purchaser can only purchase those items approved for the recipient. The system also applies rules to the purchaser that potentially limit the frequency with which a purchaser can purchase items, limit the number of recipients for which a purchaser can purchase items, etc.

The system also establishes a price for the requested item. The system establishes the price based upon the recipient. The system identifies the recipients to determine the price of at least one requested item to be purchased. Such variations in price of an item may occur if the recipient qualifies for a discount or prefixed price. Such variations in price may occur because of the recipient being indigent, a state inmate, a federal inmate, a discounted user, a VIP user, an officer, an employee, a trustee inmate, an inmate worker, user status, or other qualified purchaser.

The system identifies the recipients and purchaser to apply the rules. Such rules are individualized for each recipient. These rules may limit the number of items available to the recipient, the types of items available to a recipient, and the price of the items for the recipient.

The rules can be applied to a specific item or group of items. Such rules can apply to high calorie foods, unhealthy foods, high sugar content food and/or drinks, high salt content foods, or other dietary needs. The rules may also be applied to gender specific items. The system may also establish rules for specific slots or group of slots in the vending machine. The rules will then be applied to those slots or specific group of slots.

The vending machine system stores identification data that identifies the recipient. Such stored identification data is acquired from the recipient. Such stored identification data may be acquired during enrollment to the vending system, during processing of an inmate, prior to use of the vending system, or other time at which the recipient's identity can be verified. The system stores the stored identification data.

The stored identification data provides verified data for authenticating a recipient. Such stored identification data includes, but is not limited to, the recipient's image, biometric data, a recording of the recipient's voice, a fingerprint scan, a thumbprint scan, a palm scan, an iris scan, voice recognition, gait analysis, heartbeat rhythm, acoustical biometrics, sound absorption of a body biometric, RF capture of a person, RF capture of reflections and/or absorptions of a recipient, a heat signature, or the like. Such RF capture implements radio frequency technology that detects radio frequency reflections and/or absorptions from a person via WIFI. The RF capture uses variations in WIFI signals to recognize human silhouettes through walls.

FIG. 1 shows the delivery system generally shown as 100. The delivery system delivers the items to the recipients via delivery kiosks, such as vending machines 104, 108. The delivery system 100 provides networked vending machines 104, 108 that communicate with a server 102. The delivery system 100 can include one or more vending machines connected to a server 102. The server 102 of one embodiment tracks purchases, purchase history of a purchaser, items delivered to a recipient, recipient information, account identity information, the item(s) in each slot of a vending machine.

The server 102 may establish rules based upon each specific item as the specific brand and type, such as Doritos Cool Ranch Chips. The server may also define rules with a generic name, such as chips. In one embodiment, the vending machine 104 or vending machines 104, 108 query the server 102, such as a central server, for determining whether to dispense each item. The system 100 can also include a single vending machine 104 with the rules implemented on the vending machine 104 without a server.

The rules can be applied to a specific vending machine or groups of vending machines. Rules can be set to apply to a recipient, such as a specific inmate, or a set of recipients, such as a set of inmates. These rules may be applied to a set of recipients, such as a set of inmates, identified by location, geographic location, housing location, classification, inmate classification, age, gender, safety rating, indigent status, purchase history, account balance, account debt or other criteria.

The system 100 stores the stored identification data locally and/or remotely. In one embodiment, the delivery system 100 stores the stored identification data on a server 102. The vending machines 104, 108 communicate with the server 102 wirelessly or through a wired connection.

Identification of the user and application of the rules for the user's purchase may be applied on a computing device. Such a computing device may be installed locally on the vending machines 104, 108. Such a computing device, such as server 102, may communicate remotely with the vending machines 104, 108. In one embodiment, a computing device is installed with the vending machine for completing the transactions. A computing device may communicate with the vending machine using a multi-drop bus (MDB) interface, USB, Bluetooth, WIFI, Ethernet, electrical signals, acoustic signals, visual signals, other standard computer or vending machine communication interfaces, or the like. The computing device may identify the recipient, authenticate the recipient, apply the rules, and bill the user, the purchaser or the recipient depending upon the type of transaction.

When performed locally, the computing device performs all of the tasks associated with applying the rules, dispensing the item, performing the purchase transactions, and maintaining transaction data. The computing device applies the rules and identifies the purchase price of the item.

When performed on server 102, a computing device may be installed with the vending machine 104, 108. The computing device may perform at least one of the tasks required for purchasing the item(s). The server 102 may also perform the tasks of identifying the user, authenticating the user, applying the rules, billing the purchaser, maintain records of the transaction. The server 102 instructs the operation of the vending machines 104, 108. The server 102 instructs the vending machine 104, 108 whether the item should be dispensed to the recipient. The server 102 may also identify the purchase price of the items. The server 102 may also perform each transaction, such as the purchase of the items. The server 102 tracks the delivery of the items and refunds money for those items not delivered.

The system 100 identifies the purchaser purchasing the item and the recipient of the purchased item to apply the rules. The purchaser completes a transaction, such as the purchase of an item, on the purchaser device 112. Such a purchaser device includes a computer, a mobile computing device, a phone, a smart phone, a tablet, a kiosk, or other computing device. The purchaser enters the transaction data including a payment method, purchased item(s), quantity, and recipient(s). The purchaser completes the transaction on the purchaser device 112.

The purchaser device 112 communicates with the server 102 for completing the transaction. The server 102 applies the rules for the transaction. The rules either allow or deny the transaction. The server 102 applies the rules to determine if the transaction is allowed. The server 102 either denies the transaction or allows the transaction. The server 102 informs the purchaser device 112 if the transaction is allowed. The server 102 also processes the transaction by billing the purchaser, notifying the recipient and any other parties, and preparing for the delivery of the item to the recipient.

In one embodiment, the delivery system requires a second level of approval prior to allowing a transaction, such as a secondary authorization. The delivery system of such an embodiment may require an approving party, such as an administrator, personnel or other authorized users to approve all transactions or certain transactions. The server 102 alerts the approving party to determine if the transaction is allowed. In one embodiment, the server 102 contacts the secondary authorization after applying the rules for approving the transaction. If required, the server 102 contacts the secondary authorization for approval for those transactions allowed by the rules.

The server 102 alerts the secondary authorization, such as an approving party or outside software, of the transaction awaiting approval. The server 102 alerts the secondary authorization, such as the user and/or outside software via a text message, electronic mail, an electronic message, a telephone call, or other message. The secondary authorization, such as an approving party, inputs the approval or denial into the Secondary Authorization Device 103. The secondary authorization device communicates with the server 102 to transmit the secondary authorization, such as the approving party's input, for approving or denying the transaction. The secondary authorization, such as the approving party, enters an allow transaction to approve the transaction or a deny transaction input that does not allow the transaction.

In one embodiment, the server 102 may automatically provide the secondary authorization instead of requiring human input through a user. Certain conditions may exist at the facility that will automatically deny the transaction. The server automatically applies the deny transaction input in those conditions. Such conditions as emergency, lockdown, or other situations may exist in which the vending machines should not deliver any items.

Another embodiment accepts secondary authorization from outside software 98 as shown in FIG. 1 that automates the authorization. Such outside software 98 may be software installed on an outside computer, such as an outside server, that communicates with the server of the system. The outside software 98 may generate the authorization that is transmitted to the server. The outside software of one embodiment of the present invention may provide authorization input to which the rules are applied. The rules may allow or deny the transaction based upon the authorization input provided by the outside software. Another embodiment of the outside software may provide a list of approved inmates and the item(s) available to the approved inmates. The outside software denies the items if the recipient is not one of the approved inmates.

The outside software may also generate the authorization based upon the recipient and the location of the vending machine. The outside software approves the transaction for the inmates and the vending machines within the approved housing location. The outside software denies the transaction for those recipients outside of the approved housing location or not within the approved housing location.

The outside software of one embodiment transmits the authorization input as a file, a web service call (SOAP, JSON, etc.), data, message, or other information common for software interfaces. The outside software may communicate with the server via a network, a web service call, an ftp transfer, a UDP message, a TCP message, an HTTP POST, an HTTP GET, file exchange, or database query. The outside software communicates with the server to provide authorization input. Such authorization input may allow or deny the transaction or provide information to which the rules are applied for allowing or denying the transaction.

If the rules and the approving party, if required, approve the transaction, the server 102 alerts the recipient of the item to be delivered. Such alert may be sent by electronic mail, electronic message, text message, voice message, a notification, or other alert. The alert may include delivery instructions describing how to receive the item. The alert may also include a deadline indicating a time frame for receiving the item before the transaction is cancelled. The alert also identifies the item to be delivered. The alert may also include the identity of the purchaser in at least one embodiment.

The recipient then accesses an automated delivery kiosk(s), such as vending machine(s) 104, 108. The kiosk identifies the recipient via the identification device(s) 106, 110. The kiosk then delivers the item(s) for the identified recipient. The vending machine 104, 108 is located within the facility for delivering items to recipients within the facility, such as inmates. The vending machine 104, 108 vends products purchased by purchasers (outside users located outside of the controlled environment facility) for the recipients, usually inmates.

The identification device 106, 110 associated with the vending machine 104, 108 collects captured identification data to identify the recipient. The identification device 106, 110 identifies the recipient at the vending machine 104, 108. The identification device 106, 110 captures identification data from the recipient at the time of using the vending machine 104, 108. Such captured identification data may include, but not limited to, a password, authentication code, an identification device, scanned wristband, or biometric identification.

The identification device 106, 110 may be a keyboard, key pad, biometric, capture device, camera, microphone, fingerprint reader, RF capture device, a device for receiving of RF signals reflected from a person and/or absorbed by a person, or other biometric capture device or mechanism, or the like. The identification system captures the captured identification data.

The vending machine system identifies the recipient via stored identification data. The vending machine system compares the captured identification data with the stored identification to identify the recipient. Such a comparison may be performed by the server or by the vending machine. The system identifies a recipient based upon a match of the stored identification data with the captured identification data.

In one embodiment, the recipient indicates whether the recipient will accept the item. The recipient enters the input accepting or denying the item into the vending machine(s) 104, 108. The system delivers the item via the vending machine(s) 104, 108 if the recipient accepts the item. The system refunds the purchaser's money if the item is not delivered to the recipient. The item may not be delivered to the recipient because of unavailability of the items, the recipient denies the item, and/or the recipient never receives the item(s).

The system applies rules to the recipient according to rules established for the system. These rules apply to the recipient and the purchaser. The rules establish whether the purchaser can purchase an item for a recipient. The rules also establish the price of an item for a recipient.

The system also applies the rules to purchases made by the recipient. The server applies the rules to purchases by the recipient through the vending machine(s). The system reviews the transaction history to determine the item(s) received by the recipient and the date and time at which the recipient received the item(s).

Figure 2:
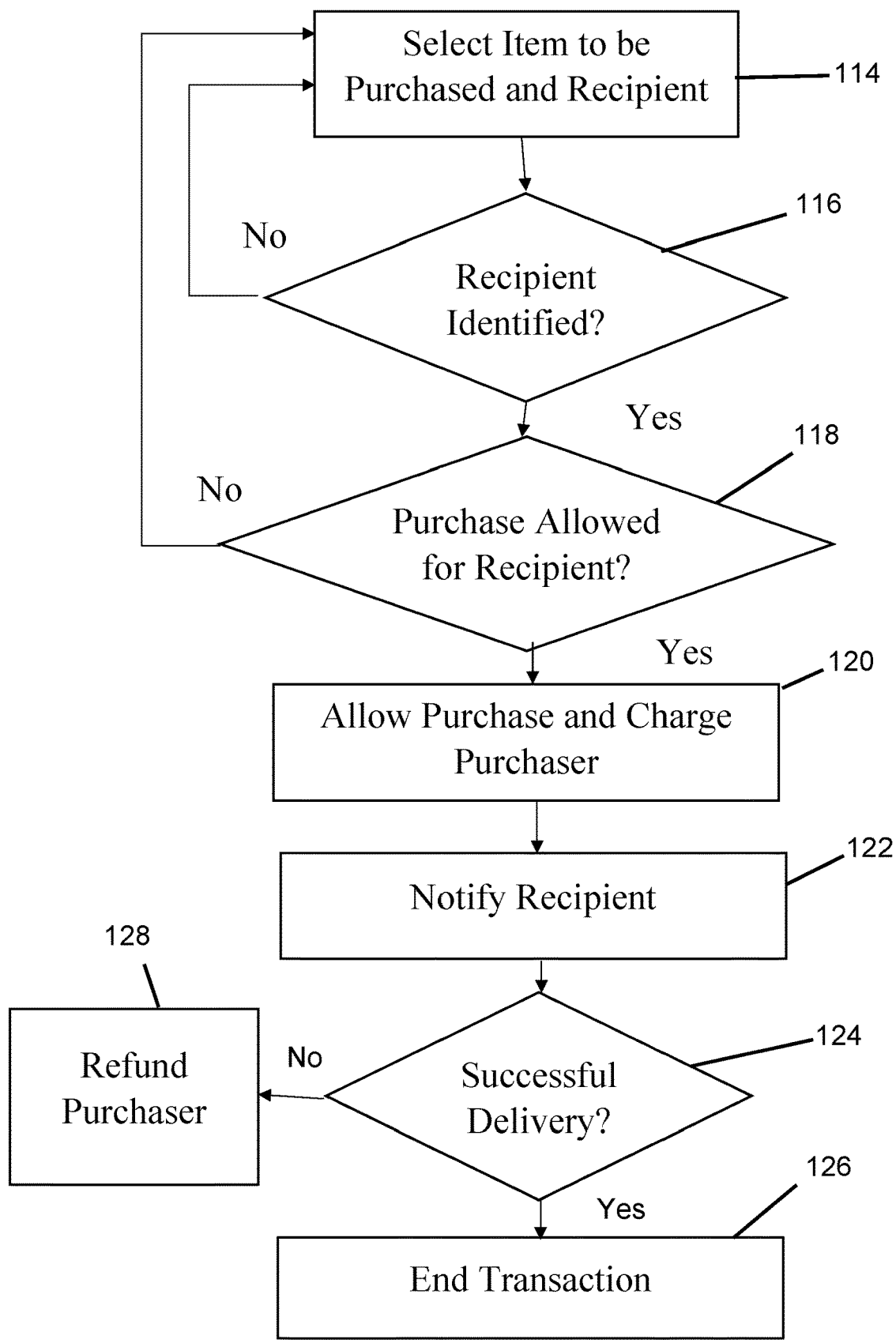
FIG. 2 is a flow chart showing a process of one embodiment of the present invention.

FIG. 2 shows the process of purchasing an item and applying the rules to a recipient. The purchaser purchases the item for the recipient via the purchaser's device. The purchase is normally located outside of the facility. The purchase shops online or through an app or through a kiosk or by phone. The purchaser selects the recipient of the item. In one embodiment, the purchaser selects both a controlled environment facility and recipient. The system of one embodiment identifies the items available for purchase for the specific inmate based on facility rules. These rules may be applied base on recipient information, including but not limited to, gender, religion, behavior, holiday, or other applied rules. One embodiment only shows those items available for purchase and delivery to the recipient based upon the rules. Another embodiment only shows those items available for purchase and delivery to the recipient based upon the rules and availability of the item within the machines of the facility in which the recipient is located.

The purchaser selects the items and quantity of the item(s) to be purchased for the recipient. The purchaser enters the item, quantity of the items, and the recipient to whom the item is delivered at Select Item to be Purchased Step 114. The system applies the rules for determining which items are available to a recipient. The system must first identify the recipient at Recipient Identified Query 116. Identifying the recipient allows the system to determine the items available to the recipient due to the rules and the items available at the recipient's location. In one embodiment, the system only shows those items available to the selected recipient due to the location and the rules. If the system cannot identify the recipient, the system does not allow the purchase of the item. Otherwise, the system proceeds forward with the transaction to determine if the rules allow the purchase for the recipient.

The system applies the rules to the recipient to determine if the purchase is allowed at Purchase Allowed Query 118. If the rules approve the purchase, the server allows the purchase transaction, charges the purchaser, and informs the purchaser of the allowed transaction at shown at Allow Purchase Step 120. If the rules deny the purchase, the server denies the purchase transaction. The server instructs the purchaser of the denial of the purchase transaction. The server denies the transaction and provides the purchaser with the opportunity to conduct another transaction at Select Item to be Purchased Step 114.

The system 100 applies the rules to determine whether to allow the transaction for the purchaser. The system may apply rules to restrict the purchase as the products and quantities are being identified or prior to purchase. Such rules include but are not limited to:
 a. Total amount per inmate per period;
 b. Total quantity per inmate per period;
 c. Maximum quantities of particular products or groups of products;
 d. Products which must be purchased together;
 e. Products which cannot be purchased together;
 f. Products which require a previous purchase; and
 g. Products which require a specific inmate status (e.g. Trustee).

The server authorizes the purchase or denies the purchase based upon the rules. The server then bills the purchaser according to the purchase price established for the recipient/recipient type.

The rules define the limits of a maximum number of the item that a recipient can receive and the purchase price. Rules authorizing the purchase of an item will be discussed below. The rules define whether or not a purchaser can purchase a particular item for a recipient. Such rules may be based upon recipient conditions, such as religious restrictions, dietary needs, recipient's health, calorie count, allergies, sugar content, salt content, etc. Other rules may authorize purchase of items based upon quantity purchased, quantity purchased within a predetermined amount of time, costs of an item, etc. Other rules may allow for substitutions or require substitutions for the requested item to be delivered to the recipient.

Such rules may include:
1. Limiting purchases based upon day or time restriction when purchases may be made;
2. Limiting purchases based on quantity of items purchased during a time period;
3. Limiting purchases based on the total purchase price of items purchased during a time period;
4. Limiting purchases based on the total volume of items purchased during a time period;
5. Limiting purchases based on the behavior of the recipient (inmates in segregation cannot purchase particular items);
6. Limiting purchases based on gender (males cannot receive items directed to females and females cannot receive items directed to males);
7. Limiting purchases based on individual item limits and/or product group limits (maximum of X number of designated item and/or product group of items);
8. Limiting purchases based on individual item limits and/or product group limits to be dispensed during a predetermined time period (maximum of X number of designated item and/or product group of items during a predetermined time period);
9. Limiting purchases based upon a recipient's health, such as diabetic or high blood pressure;
10. Limiting purchases based on a recipient's religious identification, such as kosher items only;

11. Limiting purchases based on a recipient's indigent status;
12. Immediately stop purchases if transaction denied by administration;
13. Limiting purchases based on nutritional information of the products (e.g. limit to 1,000 calories per day);
14. Alternate items available for substitution for a purchased item.
15. Providing substitute items within an item group available for dispensing based on the recipient's status. (e.g. soft toothbrush and hard toothbrush both in a toothbrush product group item available for purchase. Recipient would receive either a soft toothbrush or a hard toothbrush depending on safety classification of the recipient.)

The system 100 maintains accounting records detailing the items delivered to each recipient. Such accounting records of the system 100 may include, but are not limited to, the purchases of the recipient, items received by the recipient, the items purchased, the items received, the quantity of each item received, the amount spent, the date of each purchase, the time of each purchase, number of each item purchased by the purchaser, the remaining balance of the recipient, any credits of the recipient, and any other details relating to the purchase transaction. The system applies the rules to each recipient according to the recipient data, the user's transaction history, and the item data.

To apply the rules, the system stores information regarding the items and the users, both purchasers and recipients. The system stores information based upon the item and/or the slot at which the item is stored. The system stores such item information as product ID, name, group, price, and indigent price. Other pricing information can be included if desired. The product ID serves as a unique identifier for each item. The name identifies the name of the product. The name may refer to the generic name of the product. The name of the product may also specify the exact name of the product, such as a product name with trademark name.

The system classifies the items into a group. One embodiment of the present invention classifies the groups for the items. Such groups may include, but are not limited to, beverages, candy, chips/snacks, clothing, medical, miscellaneous, personal hygiene, site items, special, tobacco.

To apply the rules to the individual user, the system also stores user information for both recipient and purchaser. Such recipient information may include, but is not limited to, recipient ID, location ID, birthday, sex, savings account balance, debt account balance, indigent identifier. The location ID identifies the location at which the recipient is located. The birthday information enables the system to determine a recipient's age.

The system also stores purchaser data that may include, but is not limited to, purchaser ID, birthday, sex, payment account information, credit card information, billing address, billing information, transaction history, restricted recipients for whom purchaser cannot purchase an item, etc.

Each user's account is stored to allow the system to log every transaction with the delivery system. Logging each transaction enables the system to calculate each user's balance for a particular time period. Such balance information indicates the person's financial capabilities. Logging each transaction also allows application of the rules.

The system also stores financial and billing information regarding the users, both purchasers and recipients. The system stores the financial account information including, but not limited to, savings account balance, debt account balance, and other financial account information. Monitoring the savings account balance, debt account balance, and other financial account information enables the system to identify potential recipients that qualify as indigent. The system monitors the savings account balance and the debt account balance for a period of time. If the account balance and the debt account balance remain within a designated value for a time period, the system may identify the recipient as indigent. If the savings account balance and the debt account balance exceed the defined range, the system may apply restrictions.

The system can be configured to operate according to a recipient's needs. Such a system may be applied to dispensing or refusing to dispense particular item(s) to particular recipient(s). The system can be configured to apply the rules at designated locations or with designated recipients or groups of recipients.

The rules control the purchase of items by purchasers and dispensing the items to the recipients. The delivery system applies the rules to determine whether the system should allow the purchase of the item(s) by the purchaser(s) and dispensing the item(s) to the recipients(s). These rules may also establish the price of each item for a recipient.

The system applies restrictions to the purchasers when purchasing the item for the recipient. The system also applies restrictions to the recipient when dispensing or otherwise vending items to the recipient. The system may restrict access to a particular item or items. The system can also bill residents daily for housing, post commissary orders, post commissary orders on certain days, and exclude items for the usual commissary posting.

The restrictions may be applied to a recipient or a group of recipients. The system may classify the groups of recipients according to location, behavior, health, conviction, state inmate, federal inmate, indigent, etc. Such recipient groups may include indigent users, discounted user, VIP user, federal inmate, state inmate, users housed within a designated location, recipients identified with restrictions, recipients identified with a particular behavioral status, recipients within isolation, or other identified type.

Each restriction is associated with restriction data. Such restriction data may include, but is not limited to, a restriction ID, a restriction name, auto assign field, manual assign field, auto remove field, auto remove after a time period field such as X number of days, period type, days active, product's prices. The restriction may be manually assigned or automatically assigned.

Each restriction is given a unique ID and a name that provides information regarding the restriction. The restriction ID uniquely identifies the restriction. The restriction name provides an identifying name to the restriction.

The system also assigns restrictions to be applied. These restrictions apply to the users, the recipients, the purchasers, the items, groups of users. These restrictions may be automatically assigned. The auto assign field indicates whether the restriction should be automatically assigned. The manual assign field indicates whether the restriction should be manually assigned. The auto remove field indicates whether the restriction should be automatically removed.

The auto remove after time period field indicates the time period after which the restriction is removed. In one embodiment, the auto remove after time period field refers to auto remove after X days. The period type field indicated the time period for which the auto remove after time period should refer. Such a time period may be minutes, hours, weeks, months, years, etc.

The days active field indicates the days to which the restriction applies. The days may be customized for individual days, weekdays, weekends, or a set of dates.

The product's price field indicates any restrictions on the purchase price of an item. Such a product's price field sets forth the purchase price of the requested item for a recipient matching the restriction. In one embodiment, a restriction may be defined which sets a product price to zero if a recipient's account balance is below a defined threshold. In another embodiment, a restriction may be defined which sets a product price non-zero (e.g. $1.00) if a recipient has already received the requested product or similar product within a time period.

As discussed above, the system applies restrictions. The system applies manually assigned restrictions and automatically assigned restrictions. A manually assigned restriction is set by an administrator, administration, facility staff, employees, or other personnel. Such manually assigned restrictions are assigned manually for the recipients or group of recipients. Such manually assigned restrictions may be directed to dietary or disciplinary restrictions.

Manually assigned restrictions may be set to expire after a set period of time. The restriction sets forth the time period type such as days, weeks, months, etc. The restriction also sets forth the number of time periods. For example, a restriction set as auto remove after X time period sets forth a number such as 3 and sets the period type as days such that the restriction will end after 3 days. The manually assigned restriction will expire after 3 days and will be automatically removed 3 days after initiation of the restriction.

The system also sets automatically assigned restrictions. The system places automatically assigned restrictions on a user or group of users based upon at least one or more conditions. The conditions are applied as rules. An automatically assigned restriction includes, but is not limited to, the following information:

Matching restriction;
Location;
Sex;
Minimum age;
Maximum age;
Minimum balance;
Maximum balance;
Balance period;
Indigent status;
Minimum debt;
Maximum debt;
Religion;
Previous purchase history;
Previous vending history;
Inmate classification;
Privilege Level;
Released status;
Safety rating;
Health condition;
Day of week;
Holiday schedule; and
Dietary Restriction.

The automatically assigned restriction associates with a restriction wherein the matching restriction matches a restriction ID of a defined restriction. The automatically assigned restriction identifies the location to which the restriction is to be applied. Such locations may include geographic locations, housing locations, different facilities, different floors, different zones, or other designated areas that the administration may define.

The automatically assigned restriction also defines a sex to which the restriction is applied. The automatically assigned restrictions will automatically apply to members of a sex. Such a sex field enables the automatically assigned restrictions to restrict female oriented products to females and male oriented products to males.

The minimum age and maximum age fields establish a minimum age for the restriction, a maximum age for the restriction, or an age range between the minimum and the maximum ages defined by the restriction. Such fields enable the system to establish an age or range of ages to which the restriction should be applied.

The minimum balance and maximum balance fields establish a minimum balance for the restriction, a maximum balance for the restriction, or a range between the minimum and the maximum balance defined by the restriction. Such fields enable the system to establish a balance or range of balances to which the restriction should be applied.

The balance period field establishes the time period that the system reviews to determine indigent status of the user. The period may be set for a day, number of days, week, weeks, month, or months. The system maintains records concerning the balance of the user. The system adjusts the user to indigent status if the user's balance remains within a predetermined indigent balance for the balance period. In one embodiment, the system removes those automatically adjusted to indigent status if the user's balance remains above the indigent balance for the predetermined time period.

The indigent status field indicates whether the user is indigent. The users may be classified as indigent or not indigent. The system may automatically classify those users who meet the indigent standard as indigent. The system may also automatically remove those users who do not meet the indigent standard from indigent status.

The minimum debt and maximum debt fields establish a minimum debt for the restriction, a maximum debt for the restriction, or a range between the minimum and the maximum debt defined by the restriction. Such fields enable the system to establish a debt or range of debts to which the restriction should be applied.

Automatically assigned restrictions may apply to all users in a particular location, types of users, users of an identified age, users of an identified sex, etc. The system may automatically assign restrictions to all indigent users, non-indigent users, all males, all females, all users of a particular age. Multiple rules can be combined together.

The system applies restrictions to the users. The system implements restrictions via restriction limit data. Such restriction limit data includes, but is not limited to the following:

Matching restriction;
Product ID;
Product Group;
Quantity limit during single transaction;
Purchase Price Amount Spent during single transaction;
Quantity period;
Period; and
Period type.

Such restriction limit data sets forth the restrictions. The restriction limit data establishes a restriction with a product, product group, quantity of the product or product group, and the time period to apply the restriction.

The system performs the restriction check prior to dispensing an item, such as a requested item and/or distributed item. The system confirms the recipient, the type of recipient, the item to be dispensed, the product group of the item to be dispensed (such as the type of item), the recipient's transaction history, the time period for which the restriction is placed, and the quantity of items dispensed to a recipient during a specific time period. The type of recipients can include age, sex, financial status, etc. The system determines whether the item should be dispensed to the recipient. If the system determines that that recipient qualifies for the item, the vending machine dispenses the item, such as the requested item and/or distributed item. If the recipient does not qualify for the item, the vending machine restricts the recipient's access to the item and does not dispense the item to the user.

As indicated above, the server determines if the purchase is allowed at Purchase Allowed Query 118. The server applies the rules and, in some embodiments, requests permission from an approving party. If all requirements are met, the server allows the purchase and charges the purchaser at Allow Purchase Step 120. The server also notifies the purchaser that the transaction has been approved.

The system also assigns the purchase price of the item for the recipient according to the rules and restrictions. Such a purchase price may be based upon the recipient or the recipient group, such as the type of recipient. Such types of recipients may include indigent users, discounted user, VIP user, federal inmate, state inmate, recipients housed within a designated location, users identified with restrictions, recipients identified with a particular behavioral status, users within isolation, or other identified type. Upon payment of the purchase price established for the recipient, the system dispenses the item. The system may store a transaction history to account for the total number of each item received by the recipient for applying the rules.

Such pricing rules may include:
1. Free items provided to indigent inmates;
2. Reducing the price of an item for indigent inmates;
3. An item given freely to an inmate each period and then charged for each additional item (e.g. free deodorant given once per week but sold at $1.00 (or other price) after the first purchase by the recipient that week (or other designated time period);
4. Different prices for types of recipients, such as different prices for inmates compared to officers;
5. Different prices for federal inmates, state inmates, county inmates, etc.;
6. Free cup to a recipient if a particular food item, such as a ramen packet, is purchased and no cup has recently been provided to the user;
7. Free over the counter medication if caregiver approval, such as a doctor, nurse, or other caregiver, has been granted;
8. Free products up to a certain value provided to a recipient as rewards;
9. Free products previously purchased by family members or other outside parties;
10. Different prices for items purchased on credit or collected from someone other than the recipient;
11. Different prices based on the quantity of the product remaining in the vending machine;
12. Different prices based on the quantity of the product previously received by the recipient;
13. Free items given to replace items missing in a commissary order.

In one embodiment, the system calculates total price including taxes and convenience fees for the transaction. The system displays total price to the purchaser. The purchaser provides payment information for the total price. Upon approval of the payment, the system accepts the order.

In one embodiment, the system performs debt collection. The system displays debt amounts of the recipient. The system allows the purchaser to pay a portion or all of the recipient's debt. The user, such as the purchaser, may select to pay the debts of the inmate in addition to purchasing item(s). The purchaser identifies the amount to be applied to the debt and submits payment. These debts may be debts owed to the facility. In one embodiment, the recipient may not receive any items until the recipient's debt is paid to the facility.

The server then notifies the recipient of the item purchased during the transaction at Notify Recipient Step 122. The server sends an item alert to the recipient that the item is available. The alert identifies the item to be delivered. The alert may also identify the location at which the item is available and the date by which the item must be retrieved. The alert may also indicate the kiosk, such as the vending machine, at which the item is available. The alert may also identify the purchaser of the item for the recipient. The alert may also include a message from the purchaser to the recipient. The system may review the message to confirm that unwanted messages are not allowed. The alert of one embodiment provides instructions to the recipient for acquiring the item. Such a message may be displayed on the vending machine when the recipient receives the item.

In one embodiment, the system also alerts an officer or other person associated with the facility that the order for the item has been placed. Such an alert may identify the following information, but is not limited to, the purchaser, the recipient, location of the recipient, prior transactions of the purchasers, behavior status of the recipient, purchaser transaction history, recipient transaction history, purchaser data, and recipient data.

The user then accesses the delivery kiosk, such as the vending machine(s) 104, 108 to receive the item. The vending machine identifies the recipient and delivers the item to the identified recipient. In one embodiment, the recipient enters whether the recipient will accept the item or cancel the transaction. If the vending machine 104 successfully delivers the item at Successful Delivery Query 124, the system completes the transaction and confirms payment for the item at End Transaction 126. If the system does not deliver the item at Successful Delivery Query 124, the system refunds the purchaser and/or confirms refund and cancels the transaction at Refund Purchaser Step 128.

In one embodiment, the system provides substitute delivery options if the item is not available at Successful Delivery Query 124. The system may redirect the recipient to an alternative vending machine. If the vending machine is not operating property, the system may also redirect the recipient to an alternate vending machine that has the item available. The system of such an embodiment provides alternatives for a successful delivery of the item(s) before cancelling the transaction.

In one embodiment, the system provides alternate items if the item is not available at Successful Delivery Query 124. These substitutes may be allowed by the rules or required by the rules. The system may display substitute items available to the recipient. The recipient enters whether the recipient will accept the substitution or cancel the transaction. If the vending machine 104 successfully delivers the substitute item as a substitution for the original purchased item at Successful Delivery Query 123, the system completes the transaction and confirms payment for the substitute item at End Transaction 126. If the system does not deliver the item at Successful Delivery Query 124, the system refunds the purchaser and/or confirms refund and cancels the transaction at Refund Purchaser Step 128.

In one embodiment, the system automatically dispenses the substitute item if the item has multiple options available within the item group and the rules prevent delivery of the requested item. The system substitutes the item based on the recipient's identity or status. The system may display items within an item group to the remote purchaser. The item group represents multiple different SKUs for items. For example, a toothbrush product might represent a SKU for a soft toothbrush available to dangerous recipients while also representing a SKU for a hard toothbrush for recipients deemed safer.

The purchaser may select an item group as the requested item. The rules then select the item to be delivered from the item group. The purchaser purchases the item group as a requested item for delivery to a recipient without specifying which SKU is intended. The system determines the specific SKU to be vended during the Successful Delivery Query 124.

In one embodiment, the system captures data confirming delivery of the item to the recipient at End Transaction 126. The vending machine 104, 108 logs the item(s) vended to the recipient. The log may be stored on the vending machine 104, 108, the server 102, or other storage. A camera of the vending machine 104, 108 of one embodiment captures an image of the recipient and/or the item vended to the recipient. The vending machine 104, 108 may store the image locally on the vending machine, on the server 102, or other storage that may be local or remote.

The system of one embodiment may group items for efficient delivery to the recipient. The system may divide the items into groupings based on the most efficient delivery method to the recipient. For example: Product 1, Pick and ship. Product 2, Vending Machine A. Product 3, Vending Machine B.

The system tracks the items subject to the transactions. The system tracks items delivered by the vending machine and items delivered by traditional delivery. Such tracking allows the system to maintain records of the items. The system also tracks status of separately shipped items that may be separated for groupings.

The system may also send an item alert to users to inform that the item was successfully delivered to the recipient. The system sends the item alert to the purchaser. The system may also send an alert to the approving third party, correctional officers, facility employees, people associated with the facility, and nonprofits or other entities tracking receipt of the item(s).

The system of one embodiment generates reports of the items delivered to the recipient. These reports identify the items vended, the date vended, the purchaser, purchase date, the recipient, the facility location, Vending Machine ID, quantity, and other transaction data.

Figure 3:
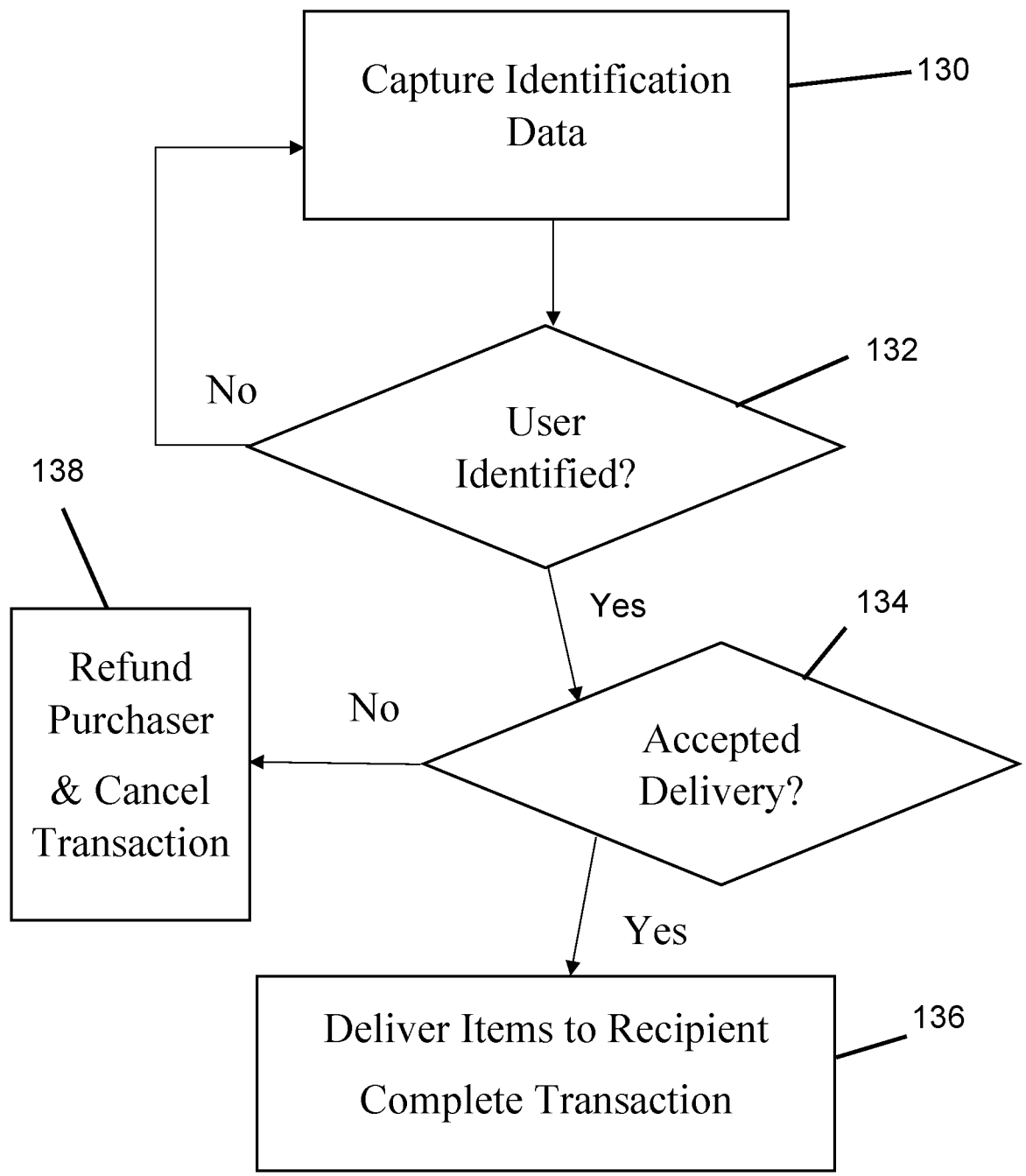
FIG. 3 is a flow chart showing a process of one embodiment of the present invention.

FIG. 3 shows the process of delivering an item to a recipient. The recipient accesses the vending machine 104, 108. The vending machine captures identification data at Capture ID Data Step 130. The vending machine captures the identification data with the Identification Device(s) 106, 110. At capture identification data step 130, the identification device 106, 110 captures data from the user of the vending machine 104, 108. The identification device 106, 110 captures the captured identification data. Such captured identification data provides a unique identification of the user. Such captured identification data may be an entered username/password, a PIN, an authorization code, biometric data, facial recognition, iris recognition, voice recognition, a carried device for identification, such as a cellphone, card information, scanned wristband, or other identifying device, etc.

The system then compares the captured identification data to the stored identification data at user identified query 132. If the system does not identify the user, the system returns to capture identification step 130 to capture identification data. If the system identifies the user via the comparison, the system delivers the item to the recipient as shown at Deliver Item(s) Step 136.

In one embodiment, the delivery process may require the recipient to accept the item. The delivery system of one embodiment automatically delivers the items to the recipient upon identifying the recipient. In another embodiment, the recipient accepts only the item(s) that the recipient will receive. The recipient may select all item(s), no item(s), or a subset of the item(s). In such an embodiment, the system queries the recipient to determine if the recipient accepts the item at Accepted Delivery Query 134. If the recipient accepts the item, the system delivers the item to the recipient and completes the transaction at Deliver Items Step 136. Completing the transaction may also include billing the purchaser for the item. If the recipient rejects the item, the system refunds the purchaser and cancels the transaction at Refund Purchaser Step 138.

In some embodiments, the vending machine may require that the recipient agree to terms and conditions before delivering the item. The vending machine may also require that the recipient receive training, instruction, education, or other information prior to receiving the item. The vending machine may provide instructions via a screen, a printout, an instructional video, etc. The system establishes these requirements that must be met prior to dispensing the item. If the recipient does not meet these requirements, the server denies the transaction.

As discussed above, the system may deliver items through the vending machine. Other items may require alternative delivery by a person or traditional delivery.

Figure 4:
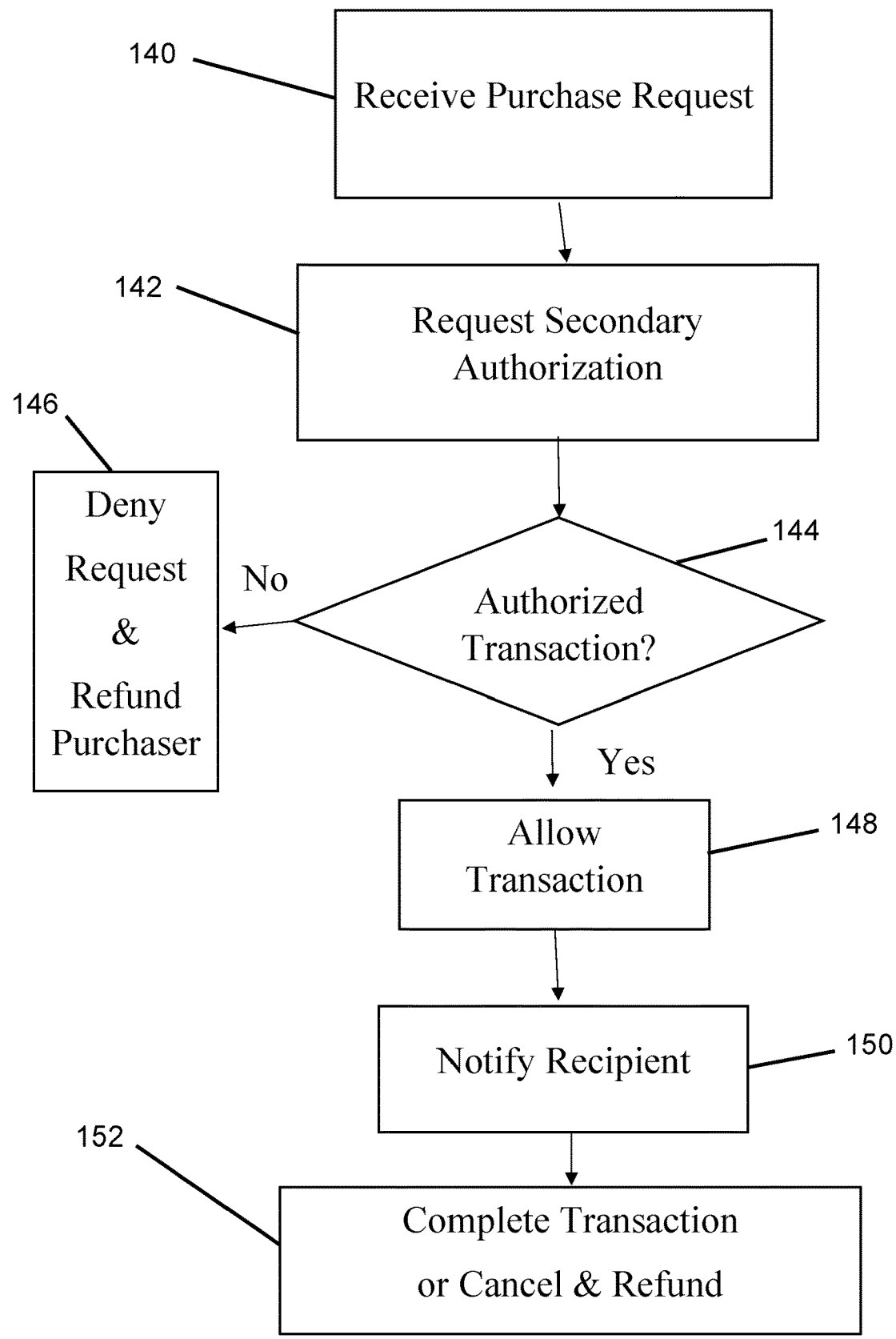
FIG. 4 is a flow chart showing a process of one embodiment of the present invention.

FIG. 4 shows the process of an approving party authorizing a transaction. In one embodiment, the system alerts the approving party, such as the officer, personnel, or other person associated with the facility. Alerts to approving parties, officers, facility personnel, or other users associated with the facility may be triggered upon behavior patterns. Alerts to officers can be triggered based on behavior patterns. Such alerts can be triggered by a purchaser, such as an outside party giving to multiple inmates. The alert can be triggered based on total vend amounts within a period, changes in products vended, and known gang member (or other status) receiving vend. Such alert is generated upon detecting suspicious patterns. A person may be giving items to more than one inmate. The system detects that the purchaser has exceeded purchasing items to a certain number of inmates.

The system of one embodiment allows secondary authorization of the transaction by an approving party, such as a person or outside software. An approving party, including but not limited to the administrators, personnel, staff, police, security, outside software, etc. may exercise additional oversight of the items delivered to the recipients. The system may implement such additional oversight to all recipients, individual recipients, a group of recipients, recipients housed in a particular location, recipients associated with a particular behavior, etc.

The system receives a purchase request of an item for a recipient at Receive Purchase Request Step 140. The system applies the rules to the transaction to determine if the transaction is approved. If approved by the rules, the system determines those transactions that require secondary authorization, such as approval from an approving party. If the transaction does not require secondary authorization, the system allows the transaction as shown in FIG. 2. If the transaction requires secondary authorizations, such as approval from an Approving Party, the system requests the secondary authorization.

The system requests the secondary authorization at Request Secondary Authorization Step 142. The system may alert an officer, approving party, or other person associated with the facility that the item has been purchased for the recipient. The system sends an approval request to the approving party for review. The approval request identifies the purchaser, the item, and the recipient. The approval request may also include recipient information including but not limited to location, disciplinary actions taken against the recipient, status updates of the recipient, behavior status, etc. The approving party approves or denies the transaction at Authorized Transaction Query 144. The approving party enters the input approving or denying the transaction into the Secondary Authorization Device 103 shown in FIG. 1.

The system denies the transaction if the approving party denies the transaction at Authorized Transaction Query 144. The system denies the purchase request and refunds the purchaser at Deny Request Step 146. Otherwise, the system allows the transaction if the approving party approves the transaction at Authorized Transaction Query 144.

The system bills the purchaser for the item as discussed above and notifies the recipient at Notify Recipient Step 150 with the alert described above. The recipient must then access the vending machine to retrieve the item. The system then delivers the item and completes the transaction at Complete Transaction Step 152 if the recipient accepts the item. Otherwise, the system cancels the transaction and refunds the purchaser at Step 152.

Figure 5:
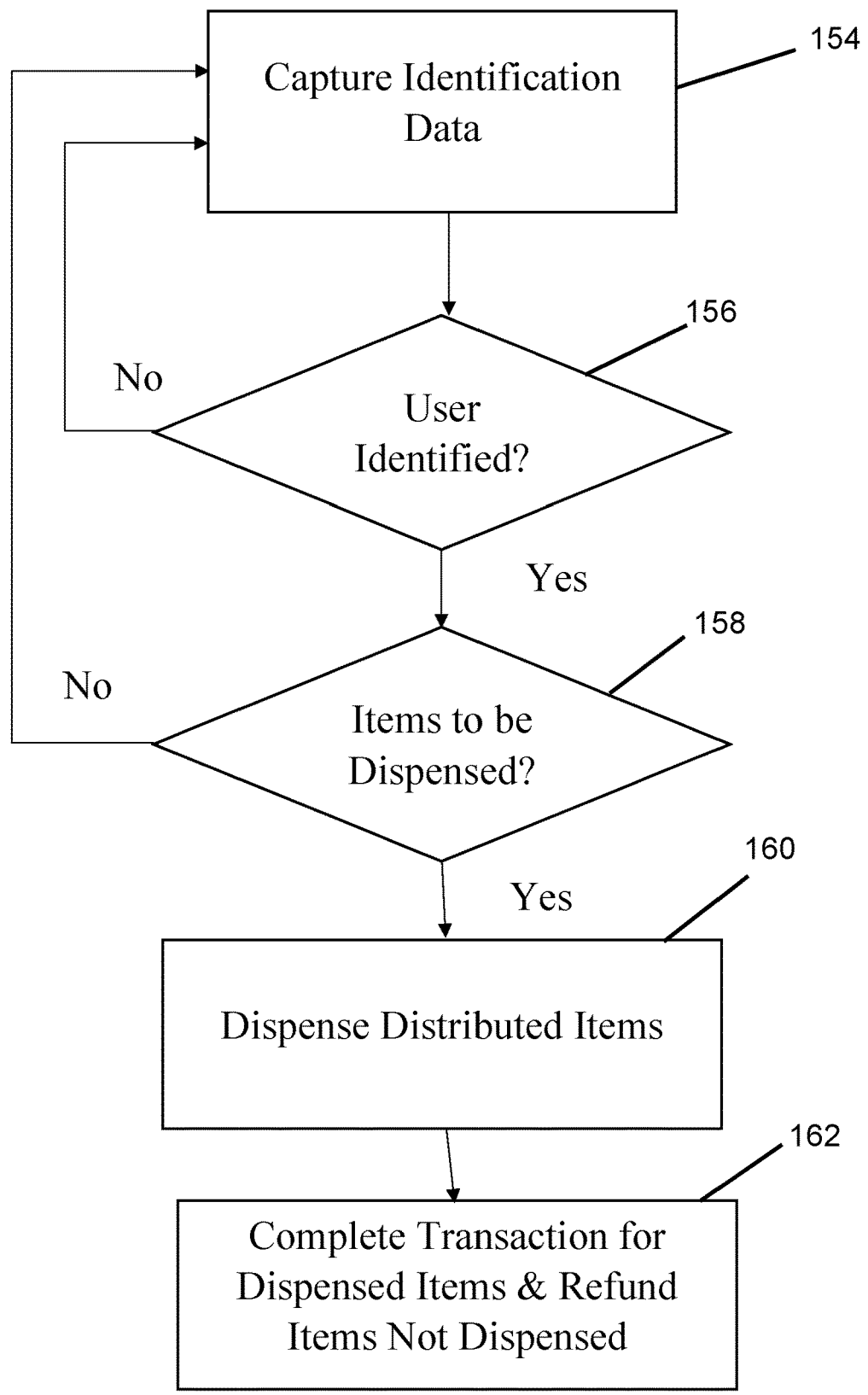
FIG. 5 is a flow chart showing a process of one embodiment of the present invention.
Figure 6:
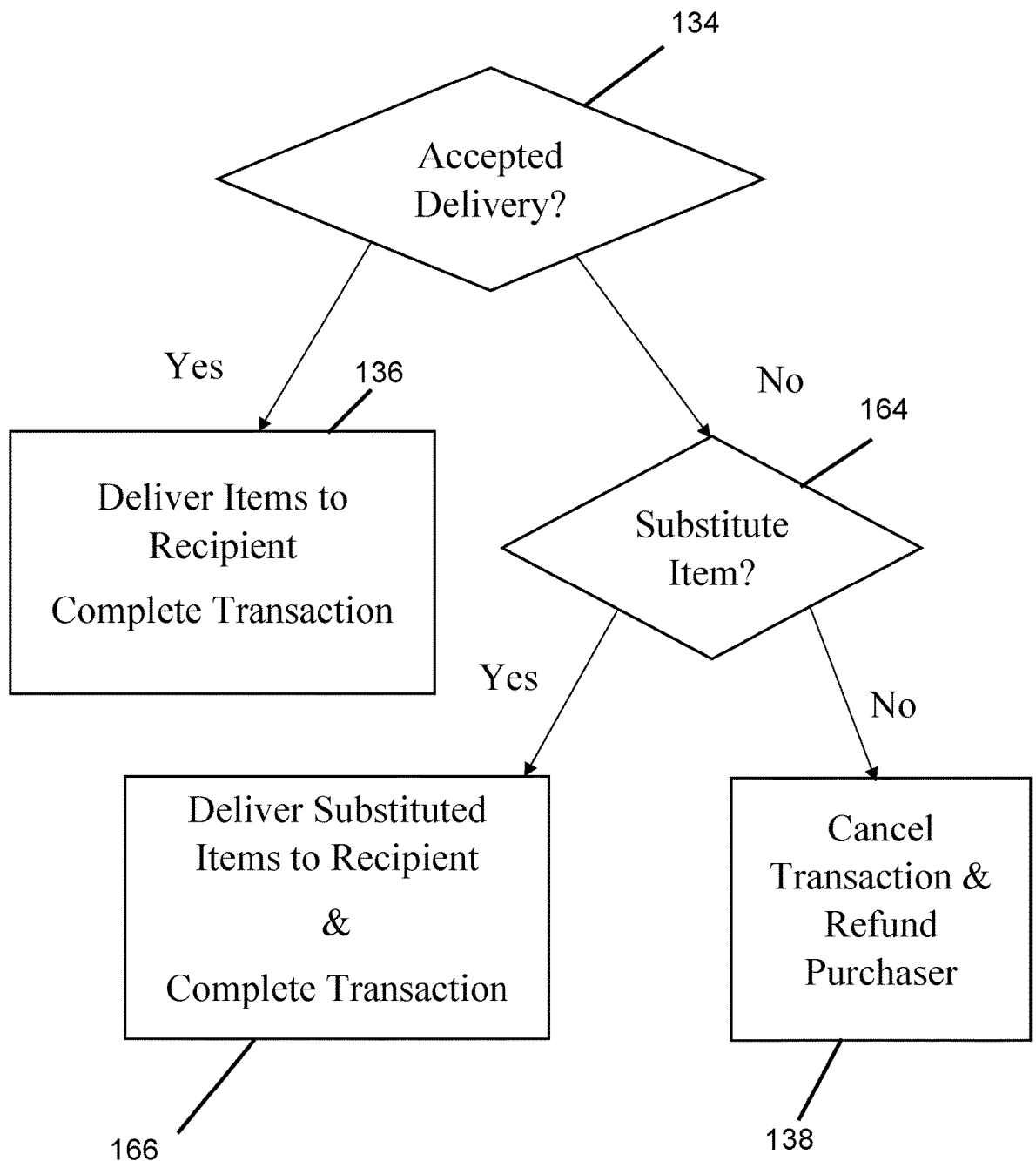
FIG. 6 is a flow chart showing a process of one embodiment of the present invention.

The vending system 100 may also be implemented as a distribution system as shown in FIG. 5. The vending system 100 distributes item(s)/product(s) to the users, such as inmates, according to those items provided to the users. These items may be provided by law, by the facility, by friends and/or family members, purchasers, or other users.

The rules of the vending system may define the products distributed to a recipient when the recipient accesses the vending machine. The rules may establish that a recipient should be provided an item upon authentication with the system. The delivery system provides the item to the recipient when the facility should provide the item, the law requires an item to be provided, the recipient has earned an item, the recipient has been gifted an item, or when the recipient should be provided an item.

For example, the system may periodically dispense an item to the recipient automatically upon authentication of the user. Such items may be periodically dispensed due to facility rules, as required by law, etc. A friend, family member, or group of friends and/or family members may also purchase an item to be automatically dispensed to the recipient. Such items are dispensed to the user upon authentication of the user at the vending machine as discussed above.

For example, a family or family member may purchase products outside of the controlled environment facility, such as a jail, to be provided to a recipient, such as an inmate. When the recipient, such as an inmate, logs in to the vending system, the vending machine may automatically distribute the distributed items, such as those purchased by third parties or other items to be provided. Automatic refunds for items not retrieved from the vending system may be provided.

The system maintains an accounting of the number of each item dispensed to the user. The dispensed number accounts for purchased items and distributed items. Such a system confirms that the dispensed number of items will not exceed the maximum number of items to be dispensed to the user.

A commissary provider can trigger distribution of items through the vending system for shortages noted in standard commissary delivery operations. The system may also be implemented to deliver the commissary items.

FIG. 5 shows the process of distributing items to the users. As discussed above, the system must identify the user. At capture identification data step 154, the identification device 106, 110 captures data from the user of the vending machine 104, 108. The identification device 106, 110 captures the captured identification data. Such captured identification data provides a unique identification of the user. Such captured identification data may be an entered username/password, a PIN, an authorization code, biometric data, facial recognition, iris recognition, voice recognition, a carried device for identification, such as a cellphone, card information, scanned wristband, or other identifying device, etc.

The system then compares the captured identification data to the stored identification data at user identified query 156. If the system does not identify the user, the system returns to capture identification step 154 to capture identification data.

The system identifies distributed items to be dispensed to the user. Such distributed items include items distributed through the commissary, the facility, items purchased by friends and/or family, or other items to be distributed to the user automatically. The system accesses a record indicating the items to be distributed to the user at items to be dispensed query 158.

The system identifies the distributed items to be dispensed to the user. The system then dispenses the distributed items to the user at Dispense distributed items 160. The system updates the records to indicate the number of items dispensed to the user and updates the records to confirm that the distributed items have been provided to the user at Complete Transaction Step 162. If the system does not dispense a distributed item to a user, the system may refund the purchaser's account for any distributed items not dispensed to the user at Step 162.

The system informs the purchaser of the delivery status of the item to the recipient. Upon completing the transaction and delivering the item to the recipient, the system sends a delivery notice to the purchaser indicating that the recipient received the item. Such delivery notice is sent to the purchaser at delivery of the items, including Steps 126, 136, 152, 162. Likewise, the system sends the purchaser a notification that the item is not delivered to the recipient and notification of the refund. Such a system provides the purchaser with the status of the delivery of the item to the recipient.

In some embodiments, the item may not be available to the recipient or the recipient may want to substitute the item. The recipient accepts or denies the item at Accepted Delivery Query 134 as described above. If the recipient accepts the item, the vending machine delivers the item and completes the transaction at Step 136 as discussed above.

If the recipient rejects the item or the item is not immediately available for vending by the vending machine at Accepted Delivery Query 134, the system may allow the recipient to substitute the item at Substitute Item Query 164. The recipient substitutes the item by selecting an item from an acceptable list of substitutes. The system then delivers the substituted item and completes the transaction as discussed above at Step 166. In one embodiment, the recipient must pay the difference in the purchase price of the item. Any refund is returned to the purchaser.

If substitution is not allowed, the system cancels the transaction. The system refunds the purchaser accordingly. The system sends the notices and alerts as discussed herein when completing the transaction and cancelling the transaction.

The system provides an automated delivery system that operates according to identified rules and restrictions. The system limits the items to be dispensed to the recipient even if such items remain in stock within the vending machine. The system also establishes prices for purchased items that can be customized for each recipient. The system also provides a distribution system for delivering distributed items to the recipient.

To maintain proper records, the system updates the recipient's account information to indicate the items received through the transactions. The system also maintains a count of the number of each item dispensed to the recipient. The system also updates the recipient's account information to identify those items distributed to the recipient.

The system provides many different customizable features for delivering items to a user. The system applies rules and restrictions to limit the recipient's access to particular items and/or group of items. Such a system can avoid problems or issues that can arise from providing recipients with items. The system also addresses pricing issues that arise from different billing systems that set a price for particular items. The system also provides a distribution system for providing recipient with items required to be provided to the recipient, items gifted to the recipient, and items otherwise to be distributed to the recipient.

The system also automates the delivery of items to eliminate the need for personnel to be responsible for such delivery. The system tracks the transactions and maintains records confirming delivery of the item(s). The system also automates the refund process for refunding purchasers for any item(s) not delivered to the recipient.

The delivery alerts identifying that an item has been received by the recipient may be sent to third parties. Such third parties include, but are not limited to, outside users, purchasers, facility officers, federal personnel, state personnel, nonprofit agencies, facility employees, or other users associated with the facility. Nonprofit agencies may receive delivery alerts identifying products to be delivered and/or delivered to indigent inmates.

The system may also be configured to vend a set of items to a group of inmates based on status assigned manually or automatically based on criteria such as current balance, monetary receipts within a period, commissary receipts within a period, etc.

The system may also implement a reward program providing credits for training, educational activities, good behavior, etc. The system provides these credits to the recipients. The recipients may then apply these credits for purchases on the vending machine. The purchases may be governed by the rules described herein.

The system tracks and maintains record of this training and educational activities. The system may then allow the recipient to receive particular items due to completion of the training and/or educational activities. The rules would have prevented the recipient from receiving these items without having received the education and training. The system now allows delivery of the items to the recipient who has completed the education and/or training.

The system provides a delivery system implemented with vending machines. The vending machines allow for automation of the delivery process by eliminating a majority of the human interaction in delivering the items to the recipients. The vending machines also reduce the time for delivery of the item(s) to the recipient. The vending machines allow for delivery of the item upon the recipient accessing the vending machine and the vending machine authenticating the recipient. Such a vending machine implements rules that identify the items that should be available to recipient.

The system has been described as applying rules to items purchased by a purchaser for a recipient. The system also applies the rules to a recipient who purchases items from a vending machine. The system applies the rules for items purchased by the recipient and items purchased for the recipient by a purchaser. The system accounts for all of the items delivered to the recipient when applying the rules.

The system applies the rules at the time that a purchaser purchases an item for the recipient. The system of one embodiment also applies the rules at the time the vending machine dispenses the item to the recipient. The system may apply the rules at the time of purchasing, the time of dispensing, or both purchasing and dispensing.

From the foregoing, it will be seen that the present invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A delivery system for dispensing at least one requested item purchased by a remote purchaser to a recipient, wherein a vending machine delivers the requested item to a recipient, the system comprising:
   a computing device that communicates with the vending machine, the computing device receiving an order for the requested item from the remote purchaser, the computing device accessing stored identification data that identifies the recipient, wherein the remote purchaser is not the recipient, wherein the remote purchaser purchases the requested item for the recipient;
   the order identifying the recipient and the requested item;
   the computing device sending an electronic message having an item alert to a correctional officer, who is not the recipient or the remote purchaser, indicating that the requested item has been purchased for the recipient by the remote purchaser, wherein the message identifies the recipient.

2. The system of claim 1 wherein the message identifies the requested item.

3. The system of claim 1 wherein the message identifies a location of the recipient wherein the computing device transmits the location of the recipient to the correctional officer.

4. The system of claim 1 wherein the computing device tracks purchases made by the purchaser, wherein the computing device sends the message if the tracked purchases match a pattern.

5. The system of claim 1 wherein the message identifies the remote purchaser.

6. The system of claim 1 wherein the message identifies a location at which the recipient is housed.

7. The system of claim 1 wherein the message identifies a location at which the vending machine is located.

8. The system of claim 1 wherein the message is sent to the correctional officer prior to delivery of the requested item.

9. The system of claim 1 wherein the message is sent to the correctional officer if the requested item is not delivered to the recipient.

10. The system of claim 1 wherein the message is sent to the correctional officer to authorize delivery of the requested item to the recipient, wherein the correctional officer manually denies delivery of the requested item to the recipient.

11. A delivery system for dispensing at least one requested item purchased by a remote purchaser to a recipient, wherein a vending machine delivers the requested item to a recipient, the system comprising:
- a computing device that communicates with the vending machine, the computing device receiving an order for the requested item from the remote purchaser, the computing device accessing stored identification data that identifies the recipient, wherein the remote purchaser is not the recipient;
- the order identifying the recipient and the requested item;
- the computing device sending an electronic message having an item alert to a correctional officer, who is not the recipient or the remote purchaser, indicating that the requested item has been purchased for the recipient, wherein the message identifies the recipient;
- wherein the computing device identifies a first restricted item and a second restricted item wherein the computing device sends the message if the tracked purchases indicate purchase of the first restricted item and the second restricted item within a time period.

12. A delivery system for dispensing at least one requested item purchased by a remote purchaser to a recipient, wherein a vending machine delivers the requested item to a recipient, the system comprising:
- a computing device that communicates with the vending machine, the computing device receiving an order for the requested item from the remote purchaser, the computing device accessing stored identification data that identifies the recipient, wherein the remote purchaser is not the recipient;
- the order identifying the recipient and the requested item;
- the computing device sending an electronic message having an item alert to a correctional officer, who is not the recipient or the remote purchaser, indicating that the requested item has been purchased for the recipient, wherein the message identifies the recipient;
- wherein the computing device sends the message if the purchaser purchases for more than two recipients within a given time period.

* * * * *